US007988045B2

(12) United States Patent
Connell, II et al.

(10) Patent No.: US 7,988,045 B2
(45) Date of Patent: Aug. 2, 2011

(54) PORTABLE DEVICE-BASED SHOPPING CHECKOUT (75) Inventors: Jonathan H. Connell, II, Cortlandt-Manor, NY (US); Myron D. Flickner, San Jose, CA (US); Norman Haas, Mount Kisco, NY (US); Arun Hampapur, Norwalk, CT (US); Sharathchandra U. Pankanti, Manhasset, NY (US)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 11/756,382

(22) Filed: May 31, 2007

(65) Prior Publication Data

US 2008/0296392 A1 Dec. 4, 2008

(51) Int. Cl.
*G06K 15/00* (2006.01)
(52) U.S. Cl. .................................. 235/383; 235/462.01
(58) Field of Classification Search .................. 235/383, 235/462.01; 705/26
See application file for complete search history.

(56) References Cited

U.S. PATENT DOCUMENTS

| 4,323,772 | A | 4/1982 | Serge |
| 5,331,455 | A | 7/1994 | Chang |
| 5,426,282 | A | 6/1995 | Humble |
| 5,467,403 | A | 11/1995 | Fishbine et al. |
| 5,477,379 | A | 12/1995 | Chang |
| 5,497,314 | A | 3/1996 | Novak |
| 5,513,264 | A | 4/1996 | Wang et al. |
| 5,546,475 | A | 8/1996 | Bolle et al. |
| 5,583,686 | A | 12/1996 | Chen |
| 5,609,223 | A | 3/1997 | Iizaka et al. |
| 5,631,976 | A | 5/1997 | Bolle et al. |
| 5,635,697 | A | 6/1997 | Shellhammer et al. |
| 5,649,970 | A | 7/1997 | Loeb et al. |
| 5,659,167 | A | 8/1997 | Wang et al. |
| 5,763,864 | A | 6/1998 | O'Hagan et al. |
| 5,811,774 | A | 9/1998 | Ju et al. |

(Continued)

FOREIGN PATENT DOCUMENTS

WO 0225506 3/2002

OTHER PUBLICATIONS

Connell II, U.S. Appl. No. 12/052,051, Office Action Communication, END920070218US1, Jun. 11, 2010, 32 pages.

(Continued)

*Primary Examiner* — Ahshik Kim
(74) *Attorney, Agent, or Firm* — Anne L. Linne; Hoffman Warnick LLC (57) ABSTRACT The present invention provides portable-device based store checkout. Specifically, a portable device is configured for store checkout. When the shopper obtains an item, he/she scans its barcode and captures its image using the portable device. The identity of the item as determined based on the barcode is compared with its appearance as determined based on the image. If the two are consistent with one another, the item is added to an inventory of items. The shopper can checkout by linking (e.g., porting) the portable device to a checkout station. The linking will cause the inventory of items to be made known to the checkout station, which will arrange payment using the portable device. Optionally, as an additional validation, the shopping receptacle can be weighed at the checkout station to make sure it reasonably meets an expected weight determined based on the inventory.

48 Claims, 3 Drawing Sheets

U.S. PATENT DOCUMENTS

| | | | |
|---|---|---|---|
| 5,815,200 A | 9/1998 | Ju et al. | |
| 5,883,968 A | 3/1999 | Welch et al. | |
| 5,918,211 A | 6/1999 | Sloane | |
| 6,005,959 A | 12/1999 | Mohan et al. | |
| 6,032,128 A | 2/2000 | Morrison et al. | |
| 6,064,469 A | 5/2000 | Brownstein | |
| 6,122,409 A | 9/2000 | Boggs et al. | |
| 6,287,299 B1 | 9/2001 | Sasnett et al. | |
| 6,310,964 B1 | 10/2001 | Mohan et al. | |
| 6,366,696 B1 | 4/2002 | Hertz et al. | |
| 6,382,357 B1 * | 5/2002 | Morrison et al. | 186/61 |
| 6,434,530 B1 * | 8/2002 | Sloane et al. | 705/26 |
| 6,504,481 B2 | 1/2003 | Teller | |
| 6,556,276 B2 | 4/2003 | Staeheli et al. | |
| 6,606,171 B1 | 8/2003 | Renk et al. | |
| 6,726,094 B1 | 4/2004 | Rantze et al. | |
| 6,853,400 B1 | 2/2005 | Matama | |
| 6,991,158 B2 | 1/2006 | Munte | |
| 7,044,370 B2 | 5/2006 | Bellis et al. | |
| 7,118,026 B2 * | 10/2006 | Harris et al. | 235/375 |
| 7,124,058 B2 | 10/2006 | Namaky et al. | |
| 7,159,770 B2 | 1/2007 | Onozu | |
| 7,168,618 B2 | 1/2007 | Schwartz | |
| 7,196,624 B2 | 3/2007 | Teller | |
| 7,202,780 B2 | 4/2007 | Teller | |
| 7,334,729 B2 | 2/2008 | Brewington | |
| 7,337,960 B2 | 3/2008 | Ostrowski et al. | |
| 7,422,147 B2 | 9/2008 | Rosenbaum | |
| 2001/0045463 A1 | 11/2001 | Madding et al. | |
| 2002/0004404 A1 | 1/2002 | Squibbs | |
| 2002/0013837 A1 | 1/2002 | Battat et al. | |
| 2002/0070861 A1 | 6/2002 | Teller | |
| 2002/0110374 A1 | 8/2002 | Staeheli et al. | |
| 2002/0121547 A1 | 9/2002 | Wieth et al. | |
| 2002/0161658 A1 | 10/2002 | Sussman | |
| 2002/0194074 A1 | 12/2002 | Jacobs | |
| 2003/0024982 A1 | 2/2003 | Bellis, Jr. et al. | |
| 2003/0071725 A1 | 4/2003 | Teller | |
| 2003/0167242 A1 | 9/2003 | Hamilton | |
| 2004/0125396 A1 | 7/2004 | Burke | |
| 2005/0096855 A1 | 5/2005 | Teller | |
| 2005/0173527 A1 | 8/2005 | Conzola | |
| 2005/0189411 A1 | 9/2005 | Ostrowski et al. | |
| 2005/0189412 A1 | 9/2005 | Hudnut et al. | |
| 2005/0200490 A1 | 9/2005 | Teller | |
| 2005/0211771 A1 | 9/2005 | Onozu | |
| 2005/0237213 A1 | 10/2005 | Teller | |
| 2006/0010033 A1 | 1/2006 | Thomas | |
| 2006/0032915 A1 | 2/2006 | Schwartz | |
| 2006/0047835 A1 | 3/2006 | Greaux | |
| 2006/0161390 A1 | 7/2006 | Namaky et al. | |
| 2006/0179164 A1 | 8/2006 | Katibian et al. | |
| 2006/0288133 A1 | 12/2006 | Katibian et al. | |
| 2006/0289637 A1 | 12/2006 | Brice et al. | |
| 2006/0290980 A1 | 12/2006 | Terada | |
| 2007/0107016 A1 | 5/2007 | Angel et al. | |
| 2007/0107017 A1 | 5/2007 | Angel et al. | |
| 2007/0107021 A1 | 5/2007 | Angel et al. | |
| 2007/0279244 A1 | 12/2007 | Haughawout et al. | |
| 2008/0027796 A1 | 1/2008 | Chaves | |
| 2008/0059281 A1 | 3/2008 | Tower et al. | |
| 2008/0141755 A1 | 6/2008 | Edwards | |
| 2008/0142598 A1 | 6/2008 | Kwan | |
| 2008/0149725 A1 | 6/2008 | Rosenbaum | |
| 2009/0119168 A1 | 5/2009 | Otto et al. | |

OTHER PUBLICATIONS

Bolle et al., "Veggie Vision: A Produce Recognition System", pp. 1-4, WACV 1996.
Connell II et al., U.S. Appl. No. 11/756,391, Office Action Communication, Dec. 2, 2009, 19 pages.
Connell II et al., U.S. Appl. No. 12/052,051, Office Action Communication, Feb. 23, 2009, 13 pages.
Connell II et al., U.S. Appl. No. 12/052,051, Office Action Communication, Jan. 6, 2010, 24 pages.
Connell II et al., U.S. Appl. No. 12/052,051, Office Action Communication, Sep. 8, 2009, 19 pages.
Connell II et al., U.S. Appl. No. 12/052,051, Office Action Communication, Jun. 26, 2009, 19 pages.
Connell II et al., U.S. Appl. No. 11/782,177, Office Action Communication, Nov. 24, 2009, 16 pages.
Connell II et al., U.S. Appl. No. 11/782,173, Office Action Communication, Nov. 27, 2009, 12 pages.
Connell II et al., U.S. Appl. No. 11/782,173, Office Action Communication, May 27, 2009, 12 pages.
Sahai, "Towards Distributed and Dynamic Network Management", IEEE, 1998, 10 pages.
Reesen, "Virtual World Technologies to Manage a Grid", IBM Corporation, 2008, 19 pages.
Bolle, "Veggie Vision: A Produce Recognition System", Produce Marketing Association, 8 pages.
IBM, RD 411124A, "Web Based Ordering System for Non-Standardised Goods e.g. Fruit, Vegetables Provides View of Item for Selection and Prints Bar Code on Item for Order Processing", Copyright 2009 Derwent Information Ltd., pp. 1-2.
U.S. Appl. No. 11/782,173, Office Action, May 27, 2009, in pp. 1-12.
U.S. Appl. No. 11/782,173, Amendment, Aug. 27, 2009, in pp. 1-13.
Connell II, et al., U.S. Appl. No. 11/782,177, Final Office Action, Apr. 23, 2010, 18 pages.
Connell II, et al., U.S. Appl. No. 12/052,046, Office Action, Apr. 2, 2010, 13 pages.
Connell II, et al., U.S. Appl. No. 11/782,173, Examiner's Answer, Apr. 30, 2010, 11 pages.
Connell II, et al., U.S. Appl. No. 11/756,391, Final Office Action, May 6, 2010, 18 pages.
Vo, U.S. Appl. No. 12/037,266, Office Action Communication, Jan. 27, 2011, 31 pages.
Basit, U.S. Appl. No. 12/037,270, Office Action Communication, Jan. 21, 2011, 13 pages.
Johnson, U.S. Appl. No. 12/052,051, Office Action Communication, Dec. 23, 2010, 31 pages.
"Web based ordering system for non-standarised goods e.g. fruit, vegetables provides view of item for selection and prints bar code on item for order processing", IBM Corporation, Jul. 10, 1998, 2 pages, abstract.
Hai, U.S. Appl. No. 12/037,270, Office Action Communication, Aug. 6, 2010, 19 pages.
Stanford, U.S. Appl. No. 12/112,318, Office Action Communication, Nov. 8, 2010, 20 pages.
Crosland, U.S. Appl. No. 12/052,046, Office Action Communication, Oct. 7, 2010, 14 pages.
Stanford, U.S. Appl. No. 12/112,318, Office Action Communication, May 3, 2011, 16 pages.

* cited by examiner

PORTABLE DEVICE-BASED SHOPPING CHECKOUT

CROSS-REFERENCE TO RELATED APPLICATION

This application is related in some aspects to the commonly owned and co-pending application entitled "Smart Scanning System," filed May 31, 2007, and which is assigned and U.S. patent application Ser. No. 11/756,391, the entire contents of which are herein incorporated by reference.

FIELD OF THE INVENTION

The present invention generally relates to portable device-based shopping checkout. Specifically, the present invention allows a portable device such as a wireless device (e.g., a cellular telephone, personal digital assistant, etc.) to be configured for shopping checkout

BACKGROUND OF THE INVENTION

Shopping checkout (e.g., retail supermarket, etc.) is a process by which most everyone is familiar. Typical checkout involves a shopper navigating about a store collecting items/items for purchase. Often the shopper will utilize a shopping receptacle such as a shopping cart and/or shopping basket. Upon completion of gathering the desired items, the shopper will proceed to a checkout station for checkout (e.g., bagging and payment). In recent years, many stores have become equipped with self-checkout stations whereby a shopper will scan and bag the items his/herself, and then make payment via the self-checkout station.

A recent trend has been to allow the shopper to perform some of these functions as he/she navigates about the store. Unfortunately, none of the existing approaches provides a way to prevent device (e.g., scanner error) and/or theft (e.g., switching barcodes, not scanning items paced in the cart, etc.). Moreover, may of the existing approaches require expensive retrofitting of shopping receptacles, which themselves provide an increased security risk. In view of the foregoing, there exists a need for an approach that solves at least one of the deficiencies in the existing art.

SUMMARY OF THE INVENTION

In general, the present invention provides portable-device based store checkout. Specifically, a portable device is configured for store checkout. When the shopper obtains an item, he/she scans its barcode and captures its image using the portable device. The identity of the item as determined based on the barcode is compared with its appearance as determined based on the image. If the two are consistent, the item is added to an inventory of items. As an optional second check, an additional image of the item can be captured using an image capture device (e.g., still image or video camera) positioned on a shopping receptacle in which the item is placed. This additional image can be compared with the image captured via the portable device. Regardless, the shopper can checkout by linking (e.g., porting) the portable device to a checkout station. The linking will cause the inventory of items to be made known to the checkout station, which will arrange payment using the portable device. Optionally, as an additional validation, the shopping receptacle can be weighed at the checkout station to make sure it reasonably meets an expected weight determined based on the inventory.

A first aspect of the present invention provides a method for portable device-based shopping checkout, comprising: receiving a scan of a barcode of an item with a portable device that is configured for shopping checkout; receiving an image of the item captured with the portable device; and determining whether an identity of the item as determined based on the scan of the barcode is consistent with an appearance of the item as determined based on the image.

A second aspect of the present invention provides a method for configuring a portable device for shopping checkout, comprising: registering the portable device for shopping checkout; providing a unique identifier to the portable device; and providing software for shopping checkout to the portable device.

A third aspect of the present invention provides a system for portable device-based shopping checkout, comprising: a module for receiving a scan of a barcode of an item with a portable device that is configured for shopping checkout; a module for receiving an image of the item captured with the portable device; and a module for determining whether an identity of the item as determined based on the scan of the barcode is consistent with an appearance of the item as determined based on the image.

A fourth aspect of the present invention provides a program product stored on a computer readable medium for portable device-based shopping checkout, the computer readable medium comprising program code for causing a portable device to: receive a scan of a barcode of an item with the portable device, the portable device being configured for shopping checkout; receive an image of the item captured with the portable device; and determine whether an identity of the item as determined based on the scan of the barcode is consistent with an appearance of the item as determined based on the image.

A fifth aspect of the present invention provides a method for deploying a system for portable device-based shopping checkout, comprising: enabling a portable device to: receive a scan of a barcode of an item with the portable device, the portable device being configured for shopping checkout; receive an image of the item captured with the portable device; and determine whether an identity of the item as determined based on the scan of the barcode is consistent with an appearance of the item as determined based on the image.

A sixth aspect of the present invention provides a method for configuring a portable device for shopping checkout, comprising: providing a computer infrastructure being operable to: register the portable device for shopping checkout; provide a unique identifier to the portable device; and provide software for shopping checkout to the portable device.

A seventh aspect of the present invention provides a computer-implemented business method for portable device-based shopping checkout, comprising: receiving a scan of a barcode of an item with a portable device that is configured for shopping checkout; receiving an image of the item captured with the portable device; and determining whether an identity of the item as determined based on the scan of the barcode is consistent with an appearance of the item as determined based on the image.

An eighth aspect of the present invention provides a computer-implemented business method for configuring a portable device for shopping checkout, comprising: registering the portable device for shopping checkout; providing a unique identifier to the portable device; and providing software for shopping checkout to the portable device.

One or more of these aspects could also be implemented as computer software embodied in a propagated signal that comprises instructions which cause a portable device and/or computer system to carry out their respective steps and/or function.

In addition, one or more of these aspects could be implemented as a data processing system that comprises: a memory medium having instructions: a bus coupled to the memory medium; and a processor coupled to the bus that when executing the instructions causes the data processing system to carry out their respective steps and/or functions.

Still yet, under each of these aspects, one or more of the following additional aspects could be incorporated: the portable device can be linked with a checkout station for checking out the inventory of items; payment for the inventory of items can be obtained using the portable device; a shopping receptacle in which the item is placed can be weighed to validate a purchase of the item; the shopping receptacle can be selected from a group consisting of a shopping cart and a shopping basket; an additional image of the item captured with an image capture device coupled to a shopping receptacle can be received; it can be determined whether the image of the item captured with the portable device is consistent with the additional image of the item captured by the image capture device; the item can be added to an inventory of items if the identity of the item as determined based on the scan of the barcode is consistent with the identity of the item as determined based on the image, and the image of the item captured with the portable device is consistent with the additional image of the item captured by the image capture device; the image capture device can be selected from a group consisting of a still image camera and a video camera; the portable device can be selected from a group consisting of a wireless device and a wired device; the wireless device can be selected from a group consisting of a cellular telephone and a personal digital assistant; the barcode being can be scanned and the can be image captured by an image capture device associated with the portable device; and/or the configuring of the portable device for shopping checkout can include: registering the portable device for shopping checkout, providing a unique identifier for the portable device, providing software for shopping checkout to the portable device.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:
 I. General Description
  A. Embodiment I
  B. Embodiment II
 II. Computerized Implementation I. General Description As used herein, the following terms have the associated meanings:

"Set"—a quantity of at least one.

"Portable Device"—any wireless device such as a cellular telephone, personal digital assistant, etc., or any wired device capable of implementing the teachings recited herein.

"Shopping Receptacle"—any container capable of holding items such as a shopping cart, a shopping basked, a shopping bag, etc.

"Image Capture Device"—means any type of camera or the like such as a still image camera, a video camera, etc.

As indicated above, the present invention provides portable-device based store checkout. Specifically, a portable device is configured for store checkout. When the shopper obtains an item, he/she scans its barcode and captures its image using the portable device. The identity of the item as determined based on the barcode is compared with its appearance as determined based on the image. If the two are consistent, the item is added to an inventory of items. As an optional second check, an additional image of the item can be captured using an image capture device (e.g., still image or video camera) positioned on a shopping receptacle in which the item is placed. This additional image can be compared with the image captured via the portable device for consistency. Regardless, the shopper can checkout by linking (e.g., porting) the portable device to a checkout station. The linking will cause the inventory of items to be made known to the checkout station, which will arrange payment using the portable device. Optionally, as an additional validation, the shopping receptacle can be weighed at the checkout station to make sure it reasonably meets an expected weight determined based on the inventory.

A. Embodiment I

Figure 1:
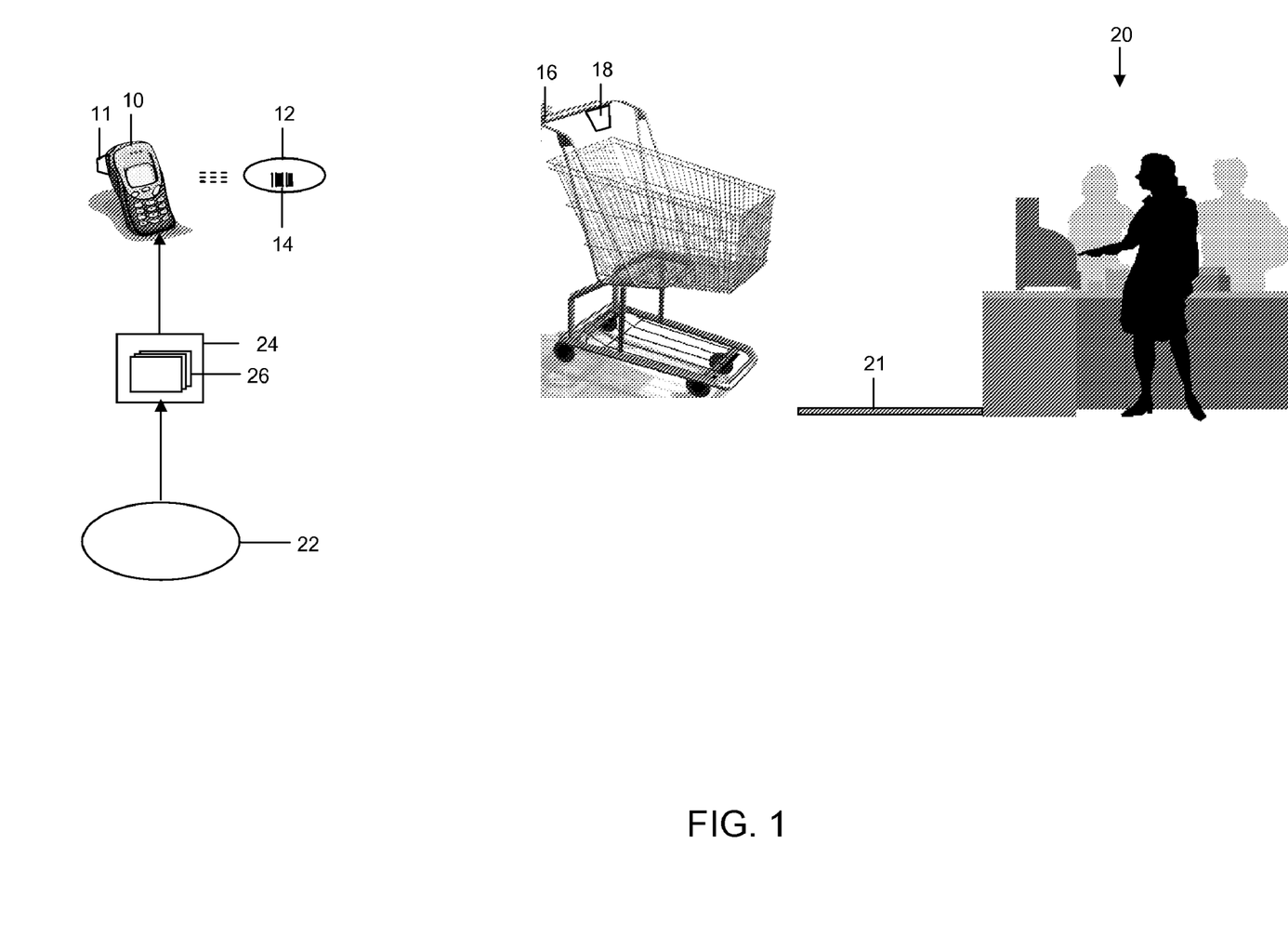
FIG. 1 depicts portable device-based shopping checkout according to one embodiment of the present invention.

Referring now to FIG. 1, portable device-based shopping checkout according to one embodiment of the present invention is shown. Specifically, under the present invention, a portable device 10 is first configured for shopping checkout. In a typically embodiment, configuration will be fostered by a provider 22 and generally includes: registering the portable device for shopping checkout (e.g., providing user/shopper contact information, pin number/password for using portable device 10 for shopping checkout, payment information and any pin number and/or passwords, etc.); providing a unique identifier to the portable device; and providing software 24 for shopping checkout to the portable device. Software 24 includes a set of modules 26 that is configured to: receive and process a scan of a barcode of an item; receive and process a first image of the item determine an identity of the item based on the scan; determine an appearance of the item based on the first image; and determine whether the identity is consistent with the appearance. Set of modules 26 can also be configured to receive and process a second image of the item (e.g., as captured by an image capture device 18 positioned on the shopping receptacle 16; and compare the first image with the second image. Still yet, set of modules 26 can be configured to link with a checkout station; and arrange payment for the item.

Once portable device 10 is configured for shopping checkout, it can be used during the gathering of items to develop an inventory of items to be purchases. For example, when an item 12 is desired to be purchased, an image capture device 11 associated therewith will scan a barcode 14 of item, and capture an image of item 12. The scan and image will be received by set of modules 24 which will determine an identity of item 12 using barcode 14 (e.g., using known methods of accessing a table or list of items as associated with values corresponding to the barcode). Set of modules 26 will also determine an appearance of item 12 using its image. This typically includes consulting a library of images associated with item identities as explained in the above-incorporated patent application. In determining the identities, portable device 10 can be configured to communicate (wirelessly or otherwise) with data sources that contain the necessary information/associations. For example, portable device 10 a can obtain/download the information over a wireless network from a source, or can be ported to kiosk or the like in the store to download the information.

In any event, set of modules 26 will then compare the identity to the appearance to determine if they match. If so, Set of modules 26 adds the item to the current inventory of items. If not, set of modules 26 refuses such addition. In either event, a corresponding audible and/or visual notification or the additional or denial can be provided to the user/shopper. As an optional additional validation of item 12, an image capture device 18 optionally positioned on shopping receptacle 16 can capture a second image of item 12 and/or scan its barcode. This image can be communicated to portable device 10, where set of modules 26 will receive and compare it to the image captured by image capture device 11. If there is a difference (no match), the addition of item 12 to the inventory of items can be denied. If there is a match, however, the item 12 can be added to the inventory of items. Corresponding audible and/or visual notifications could also be provided. In addition, image capture device 18 could also scan barcode similar to image capture device 11. In such a case, the identity as determined based on the barcode scans and image captured by image capture device 18 could be compared to those determined base on the barcode and image captured by image capture device 11 (e.g., a four-way validation).

Regardless, if item 12 is later desired to be removed from the inventory of items prior to checkout, the user/shopper will activate a subtract function on portable device and scan/image capture item 12 again. Once checkout is desired, the portable device will be linked (e.g., wirelessly, ported, etc.) with a (self or manned) checkout station 20. This will cause inventory of items to be made known to checkout station 20 for cashing out. As yet an additional check, shopping receptacle 16 could be weighed on a scale 21 at checkout station 20 to see if its expected weight (based on the weight of shopping receptacle 16 plus the weight of items in the inventory of items) is consistent with the actual weight of the shopping receptacle 16. If a certain accuracy level is not met, final checkout could be denied. In any event, payment for the inventory of items can be arranged using the portable device. That is, payment information that was provided at device registration could be leveraged to pay for the items. This can be done using portable device 10 itself or the communication means existing at checkout station 20. It can also reduce the reliance on credit card readers, bill/coin collectors, and store personnel at checkout station 20.

B. Embodiment II

Figure 2:
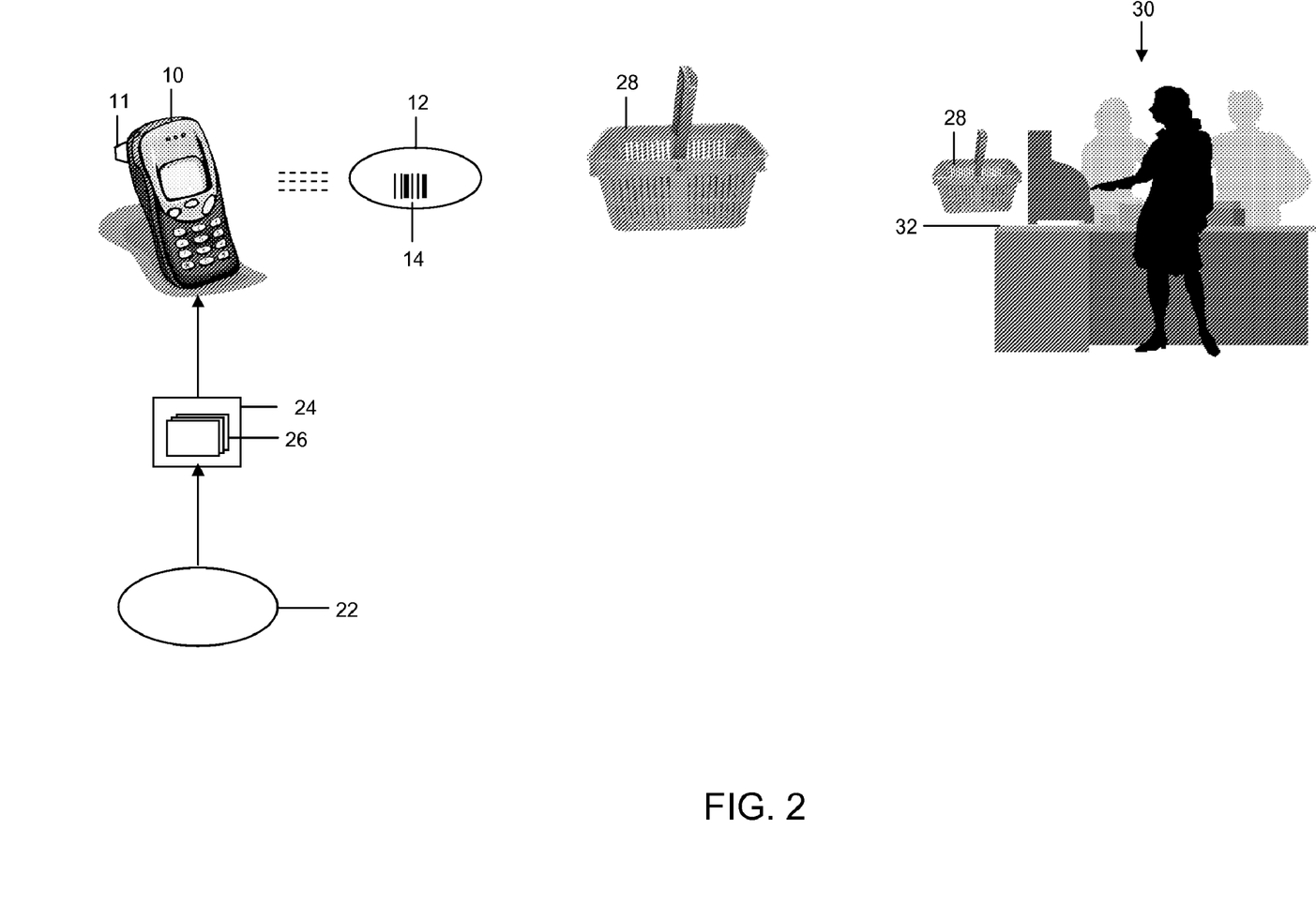
FIG. 2 depicts portable device-based shopping checkout according to another embodiment of the present invention.

Referring now to FIG. 2, portable device-based shopping checkout according to another embodiment of the present invention is shown. Primary functionality remains similar to the embodiment of FIG. 1, but it will be repeated for clarity of understanding. Specifically, under the embodiment of FIG. 2, portable device 10 is first configured for shopping checkout. In a typically embodiment, configuration will be fostered by a provider 22 and generally includes: registering the portable device for shopping checkout (e.g., providing user/shopper contact information, pin number/password for using portable device 10 for shopping checkout, payment information and any pin number and/or passwords, etc.); providing a unique identifier to the portable device; and providing software 24 for shopping checkout to the portable device. Software 24 includes a set of modules 26 that is configured to: receive and process a scan of a barcode of an item; receive and process a first image of the item determine an identity of the item based on the scan; determine an appearance of the item based on the first image; and determine whether the identity is consistent with the appearance. Set of modules 26 can also be configured to receive and process a second image of the item (e.g., as captured by an image capture device 18 positioned on the shopping receptacle 28; and compare the first image with the second image. Still yet, set of modules 26 can be configured to link with a checkout station; and arrange payment for the item.

Once portable device 10 is configured for shopping checkout, it can be used during the gathering of items to develop an inventory of items to be purchases. For example, when an item 12 is desired to be purchased, an image capture device 11 associated therewith will scan a barcode 14 of item, and capture an image of item 12. The scan and image will be received by set of modules 24 which will determine an identity of item 12 using barcode 14 (e.g., using known methods of accessing a table or list of items as associated with values corresponding to the barcode). Set of modules 26 will also determine an appearance of item 12 using its image. In determining/obtaining the identities and/or appearances, portable device 10 can be configured to communicate (wirelessly or otherwise) with data sources that contain the necessary information/associations. For example, portable device 10 a can obtain/download the information over a wireless network from a source, or can be ported to kiosk or the like in the store to download the information.

In any event, set of modules 26 will then compare the identity to the appearance to determine if they are consistent. If so, set of modules 26 adds the item to the current inventory of items. If not, set of modules 26 refuses such addition. In either event, a corresponding audible and/or visual notification or the additional or denial can be provided to the user/shopper. Regardless, if item 12 is later desired to be removed from the inventory of items prior to checkout, the user/shopper will activate a subtract function on portable device and scan/image capture item 12 again. Once checkout is desired, the portable device will be linked (e.g., wirelessly, ported, etc.) with a (self or manned) checkout station 30. This will cause inventory of items to be made known to checkout station 30 for cashing out. As an additional check, shopping receptacle 28 could be weighed on a scale 32 at checkout station 30 to see if its expected weight (based on the weight of shopping receptacle 28 plus the weight of items in the inventory of items) is consistent with the actual weight of the shopping receptacle 28. If a certain accuracy level is not met, final checkout could be denied. In any event, payment for the inventory of items can be arranged using the portable device. That is, payment information that was provided at device registration could be leveraged to pay for the items. This can be done using portable device 10 itself or the communication means existing at checkout station 30. It can also reduce the reliance on credit card readers, bill/coin collectors, and store personnel at checkout station 30.

In general, this embodiment does not show an image capture device on shopping receptacle 28 due to the portability of shopping receptacle 28. A similar tactic could be taken if shopping receptacle 28 is a shopping bag. However, the image capture device 18 of FIG. 1 could be implemented on shopping receptacle 28 as so desired. In such an event, the functionality would be as stated in Section A above. Either way, set of modules 26 are typically configured to accommodate image capture device 18 whether or not it is actually provided and/or used.

II. Computerized Implementation

Figure 3:
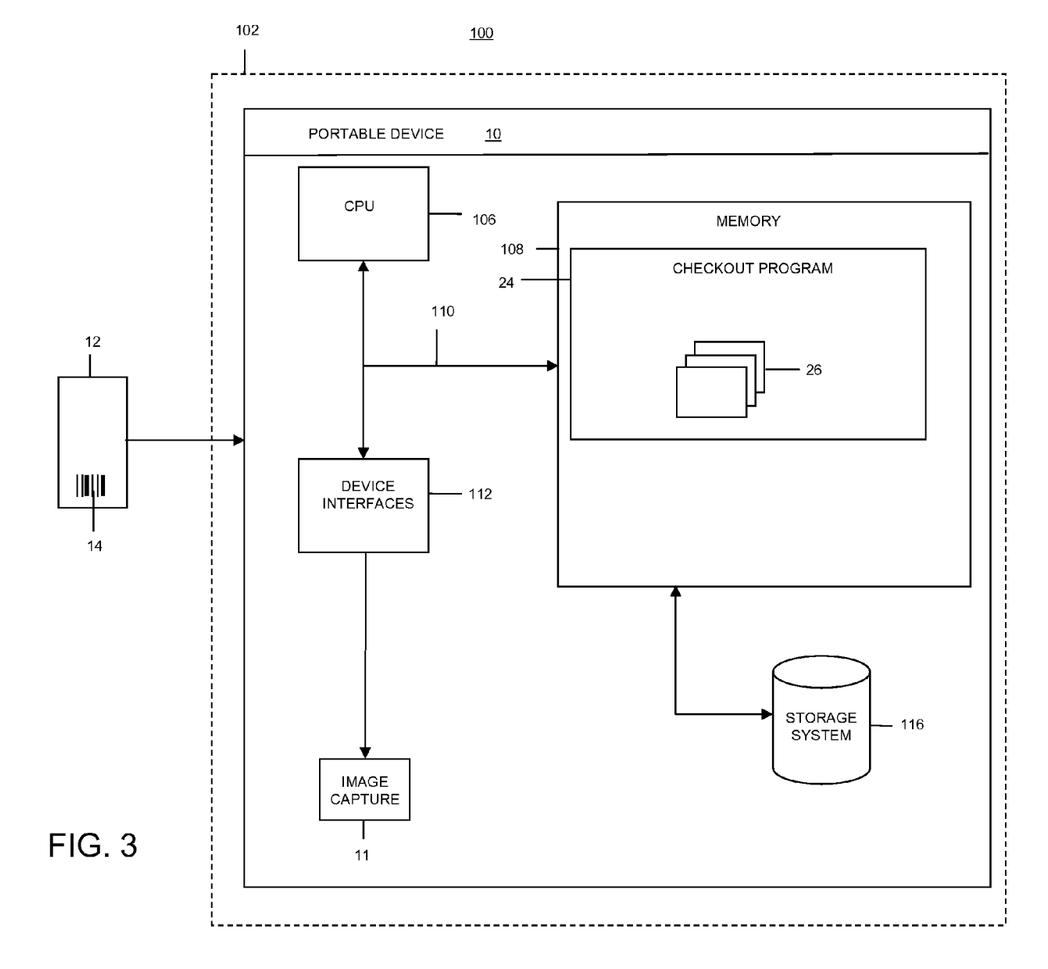
FIG. 3 depicts a more specific computerized implementation according to the present invention.

Referring now to FIG. 3, a computerized implementation 100 of the present invention is shown. As depicted, implementation 100 includes portable device 10 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, portable device 10 includes a processing unit 106, a memory 108, a bus 110, and device interfaces 112. Further, portable device 10 is shown having image capture device 11 and storage system 116 that communicate with bus via device interfaces (although image capture device 11 alternatively could directly communicate with bus 110). In general, processing unit 106 executes computer program code, such as checkout software/program, which is stored in memory 108 and/or storage system 116. While executing computer program code, processing unit 106 can read and/or write data to/from memory 108, storage system 116, and/or device interfaces 112. Bus 110 provides a communication link between each of the components in portable device 10. Although not shown, portable device 10 could also include I/O interfaces that communicate with: one or more external devices such as a kiosk, a checkout station, a keyboard, a pointing device, a display, etc.); one or more devices that enable a user to interact with portable device 10; and/or any devices (e.g., network card, modem, etc.) that enable portable device 10 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, portable device 10 is only representative of various possible computer systems that can include numerous combinations of hardware. To this extent, in other embodiments, portable device 10 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external device 114. Still further, it is understood that one or more additional components (e.g., system software, math co-processing unit, etc.) not shown in FIG. 3 can be included in portable device 10.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into portable device 10.

Shown in memory 108 of portable device 10 is checkout program 24, which a set of modules 26. The modules generally provide the functions of the present invention as described herein. Specifically (among other things), set of modules 120 is configured to: receive and process a scan of a barcode of an item; receive and process a first image of the item; determine an identity of the item based on the scan; determine an appearance of the item based on the first image; and determine whether the identity is consistent with the appearance. Set of modules 26 can also be configured to: receive and process a second image of the item (e.g., as captured by an image capture device positioned on the shopping receptacle), and compare the first image with the second image. If there is a difference (no match), the addition of item 12 to the inventory of items can be denied. If there is a match, however, the item 12 can be added to the inventory of items. Set of modules 26 can also be configured to perform the four-way validation of barcode scans and image captures by the image capture device 11 on portable device 10 and the image capture device on the shopping receptacle.

If item 12 is later desired to be removed from the inventory of items prior to checkout, the user/shopper will activate a subtract function on portable device and scan/image capture item 12 again, at which point set of modules 26 will remove the item 12 from the inventory of items. Once checkout is desired, the portable device will be linked (e.g., wirelessly, ported, etc.) with a (self or manned) checkout station. This will cause inventory of items to be made known by set of modules 26 to the checkout station for cashing out. As yet an additional check, the shopping receptacle could be weighed on a scale 21 at the checkout station to where set of modules 26 and/or checkout station software will determine if its expected weight (based on the weight of shopping receptacle 16 plus the weight of items in the inventory of items) is consistent with the actual weight of the shopping receptacle 16. If a certain accuracy level is not met, final checkout could be denied. In any event, payment for the inventory of items can be arranged via set of modules 26. That is, payment information that was provided at device registration could be leveraged to pay for the items. This can be done using portable device 10 itself or the communication means existing at the checkout station.

While shown and described herein as portable device-based shopping checkout, it is understood that the invention further provides various alternative embodiments. For example, in one embodiment, the invention provides a computer-readable/useable medium that includes computer program code to enable a computer infrastructure to provide portable device-based shopping checkout. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage system 116 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide portable device-based shopping checkout and/or configuration of portable devices for shopping checkout. In this case, the service provider can create, maintain, support, etc., a computer infrastructure, such as computer infrastructure 102 (FIG. 3) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for portable device-based shopping checkout. In this case, a computer infrastructure, such as computer infrastructure 102 (FIG. 3), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as portable device 10 (FIG. 3), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for portable device-based shopping checkout, comprising:
    receiving a scan of a barcode of an item with a portable device that is configured for shopping checkout;
    receiving an image of the item captured with the portable device;
    determining whether an identity of the item as determined based on the scan of the barcode is consistent with an appearance of the item as determined based on the image;
    receiving an additional image of the item captured with an image capture device couple to a shopping receptacle;
    determining whether the image of the item captured with the portable device is consistent with the additional image of the item captured by an image capture device; and
    adding the item to an inventory of items if the identity of the item as determined based on the scan of the barcode is consistent with the identity of the item as determined based on the image, and the image of the item captured with the portable device is consistent with the additional image of the item captured by the image capture device.

2. The method of claim 1, further comprising adding the item to an inventory of items stored on the portable device if a match is established.

3. The method of claim 2, further comprising removing the item from the inventory of items using the portable device.

4. The method of claim 2, further comprising linking the portable device with a checkout station for checking out the inventory of items.

5. The method of claim 4, further comprising obtaining payment for the inventory of items using the portable device.

6. The method of claim 4, further comprising weighing the shopping receptacle in which the item is placed to validate a purchase of the item.

7. The method of claim 6, the shopping receptacle being selected from a group consisting of a shopping cart and a shopping basket.

8. The method of claim 1, the image capture device being selected from a group consisting of a still image camera and a video camera.

9. The method of claim 1, the portable device being selected from a group consisting of a wireless device and a wired device.

10. The method of claim 9, the wireless device being selected from a group consisting of a cellular telephone and a personal digital assistant.

11. The method of claim 1, the barcode being scanned and the image being captured by the image capture device associated with the portable device.

12. The method of claim 1, further comprising configuring the portable device for shopping checkout.

13. The method of claim 12, the configuring comprising:
registering the portable device for shopping checkout;
providing a unique identifier for the portable device; and
providing software for shopping checkout to the portable device.

14. A method for configuring a portable device for shopping checkout, comprising:
registering the portable device for shopping checkout;
providing a unique identifier to the portable device; and
providing software for shopping checkout to the portable device, the software being configured to:
determine whether an identity of an item as determined based on a scan of a barcode is consistent with an appearance of the item as determined based on an image received with the portable device;
determine whether the image of the item captured with the portable device is consistent with an additional image of the item captured by an image capture device coupled to a shopping receptacle; and
add the item to an inventory of items if the identity of the item as determined based on the scan of the barcode is consistent with the identity of the item as determined based on the image, and the image of the item captured with the portable device is consistent with the additional image of the item captured by the image capture device.

15. The method of claim 14, the software being further configured to:
determine an identity of the item based on the scan; and
determine an appearance of the item based on the first image.

16. The method of claim 15, the software being further configured to
compare the first image with the second image.

17. The method of claim 15, the software being further configured to:
link with a checkout station; and
arrange payment for the item.

18. The method of claim 17, the shopping receptacle being selected from a group consisting of a shopping cart and a shopping basket.

19. A system for portable device-based shopping checkout, comprising:
a module for receiving a scan of a barcode of an item with a portable device that is configured for shopping checkout;
a module for receiving an image of the item captured with the portable device;
a module for determining whether an identity of the item as determined based on the scan of the barcode is consistent with an appearance of the item as determined based on the image;
a module for receiving an additional image of the item with an image capture device coupled to a shopping receptacle;
a module for determining whether the image of the item captured with the portable device is consistent with the additional image of the item captured by the image capture device; and
a module for adding the item to an inventory of items if the identity of the item as determined based on the scan of the barcode is consistent with the identity of the item as determined based on the image, and the image of the item captured with the portable device is consistent with the additional image of the item captured by the image capture device.

20. The system of claim 19, further comprising a module for adding the item to an inventory of items stored on the portable device if a match is established.

21. The system of claim 20, further comprising a module for removing the item from the inventory of items using the portable device.

22. The system of claim 20, further comprising a module for linking the portable device with a checkout station for checking out the inventory of items.

23. The system of claim 22, further comprising a module for obtaining payment for the inventory of items using the portable device.

24. The system of claim 22, further comprising a module for processing a weight of the shopping receptacle in which the item is placed to validate a purchase of the item.

25. The system of claim 24, the shopping receptacle being selected from a group consisting of a shopping cart and a shopping basket.

26. The system of claim 19, the image capture device being selected from a group consisting of a still image camera and a video camera.

27. The system of claim 19, the portable device being selected from a group consisting of a wireless device and a wired device.

28. The system of claim 27, the wireless device being selected from a group consisting of a cellular telephone and a personal digital assistant.

29. The system of claim 19, the barcode being scanned and the image being captured by the image capture device associated with the portable device.

30. The system of claim 19, further comprising a module for configuring the portable device for shopping checkout.

31. The system of claim 30, the configuring comprising:
a module for registering the portable device for shopping checkout;
a module for providing a unique identifier for the portable device; and
a module for providing software for shopping checkout to the portable device.

32. A program product stored on a computer readable medium for portable device-based shopping checkout, the computer readable medium comprising program code for causing a portable device to:
receive a scan of a barcode of an item with the portable device, the portable device being configured for shopping checkout;
receive an image of the item captured with the portable device;
determine whether an identity of the item as determined based on the scan of the barcode is consistent with an appearance of the item as determined based on the image;
receive an additional image of the item captured with an image capture device coupled to a shopping receptacle;

determine whether the image of the item captured with the portable device is consistent with the additional image of the item captured by the image capture device; and add the item to an inventory of items if the identity of the item as determined based on the scan of the barcode is consistent with the identity of the item as determined based on the image, and the image of the item captured with the portable device is consistent with the additional image of the item captured by the image capture device.

33. The program product of claim 32, the computer readable medium further comprising program code for causing the portable device to add the item to an inventory of items stored on the portable device if a match is established.

34. The program product of claim 33, the computer readable medium further comprising program code for causing the portable device to remove the item from the inventory of items using the portable device.

35. The program product of claim 33, the computer readable medium further comprising program code for causing the portable device to link the portable device with a checkout station for checking out the inventory of items.

36. The program product of claim 35, the computer readable medium further comprising program code for causing the portable device to obtain payment for the inventory of items using the portable device.

37. The program product of claim 32, the image capture device being selected from a group consisting of a still image camera and a video camera.

38. The program product of claim 32, the portable device being selected from a group consisting of a wireless device and a wired device.

39. The program product of claim 38, the wireless device being selected from a group consisting of a cellular telephone and a personal digital assistant.

40. The program product of claim 32, the barcode being scanned and the image being captured by the image capture device associated with the portable device.

41. A method for deploying a system for portable device-based shopping checkout, comprising:
enabling a portable device to:
receive a scan of a barcode of an item with the portable device, the portable device being configured for shopping checkout;
receive an image of the item captured with the portable device;
determine whether an identity of the item as determined based on the scan of the barcode is consistent with an appearance of the item as determined based on the image
receive an additional image of the item captured with an image capture device coupled to a shopping receptacle;
determine whether the image of the item captured with the portable device is consistent with the additional image of the item captured by the image capture device; and
add the item to an inventory of items if the identity of the item as determined based on the scan of the barcode is consistent with the identity of the item as determined based on the image, and the image of the item captured with the portable device is consistent with the additional image of the item captured by the image capture device.

42. The method of claim 41, the shopping receptacle being selected from a group consisting of a shopping cart and a shopping basket.

43. The method for deploying a system of claim 41, further comprising:
registering the portable device for shopping checkout;
providing a unique identifier to the portable device; and
providing software for shopping checkout to the portable device.

44. The method of claim 43, the software being configured to:
receive and process a scan of a barcode of an item;
receive and process a first image of the item
determine an identity of the item based on the scan;
determine an appearance of the item based on the first image; and
determine whether the identity is consistent with the appearance.

45. The method of claim 44, the software being further configured to:
receive an process a second image of the item; and
compare the first image with the second image.

46. The method of claim 44, the software being further configured to:
link with a checkout station; and
arrange payment for the item.

47. A system comprising:
a computer system for portable device-based shopping checkout by performing a method comprising:
determining whether an identity of an item as determined based on a scan of a barcode is consistent with an appearance of the item as determined based on an image received with a portable device that is configured for shopping checkout;
determining whether the image of the item captured with the portable device is consistent with an additional image of the item captured by an image capture device coupled to a shopping receptacle; and
adding the item to an inventory of items if the identity of the item as determined based on the scan of the barcode is consistent with the identity of the item as determined based on the image, and the image of the item captured with the portable device is consistent with the additional image of the item captured by the image capture device.

48. The system of claim 47, the method further comprising:
configuring the portable device for shopping checkout, the configuring comprising:
registering the portable device for shopping checkout;
providing a unique identifier for the portable device; and
providing software for shopping checkout to the portable device.

* * * * *